(12) United States Patent
Wang et al.

(10) Patent No.: US 6,350,800 B1
(45) Date of Patent: Feb. 26, 2002

(54) SOFT POLYMER GEL

(75) Inventors: Xiaorong Wang, Akron; James E. Hall, Mogadore; Victor J. Foltz, Akron, all of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/586,866

(22) Filed: Jun. 5, 2000

(51) Int. Cl.[7] .................. C08K 5/09; C08G 63/91; C08L 51/00

(52) U.S. Cl. ............. 524/320; 524/322; 524/504; 525/69; 525/73

(58) Field of Search ................ 524/320, 322, 524/504; 525/69, 73

(56) References Cited

U.S. PATENT DOCUMENTS

| | | |
|---|---|---|
| 2,725,367 A | 11/1955 | Niederhauser et al. |
| 2,971,934 A | 2/1961 | Brown et al. |
| 3,244,664 A | 4/1966 | Zelinski et al. |
| 3,281,383 A | 10/1966 | Zelinski et al. |
| 3,297,654 A | 1/1967 | Barr et al. |
| 3,414,551 A | 12/1968 | Reid et al. |
| 3,428,596 A | 2/1969 | Strand et al. |
| 3,480,580 A | 11/1969 | Joyner et al. |
| 3,481,910 A | 12/1969 | Brunson et al. |
| 3,492,227 A | 1/1970 | Kolaian |
| 3,528,936 A | 9/1970 | Kent et al. |
| 3,577,365 A | 5/1971 | Folzenlogen et al. |
| 3,594,452 A | 7/1971 | De La Marre et al. |
| 3,751,378 A | 8/1973 | Cowperthwaite et al. |
| 3,761,458 A | 9/1973 | Holler et al. |
| 3,796,687 A | 3/1974 | Collette et al. |
| 3,840,449 A | 10/1974 | Furukawa et al. |
| 3,862,265 A | 1/1975 | Steinkamp et al. |
| 3,970,608 A | 7/1976 | Furukawa et al. |
| 3,985,830 A | 10/1976 | Fetters et al. |
| 3,998,907 A | 12/1976 | Di Giulio |
| 4,015,612 A | 4/1977 | Pavlik et al. |
| 4,017,669 A | 4/1977 | Collette et al. |
| 4,087,485 A | 5/1978 | Huff |
| 4,104,332 A | 8/1978 | Zelinksi |
| 4,132,531 A | 1/1979 | Cummings et al. |
| 4,139,417 A | 2/1979 | Marie et al. |
| 4,151,336 A | 4/1979 | Sackmann et al. |
| 4,151,337 A | 4/1979 | Kanoh et al. |
| 4,287,314 A | 9/1981 | Fava |
| 4,304,886 A | 12/1981 | Bean et al. |
| 4,374,951 A | 2/1983 | Lee et al. |
| 4,404,321 A | 9/1983 | Abolins et al. |
| 4,404,322 A | 9/1983 | Saito et al. |
| 4,408,010 A | 10/1983 | Le-Khac |
| 4,423,196 A | 12/1983 | Arlt et al. |
| 4,427,828 A | 1/1984 | Hergenrother et al. |
| 4,502,229 A | 3/1985 | Kitzman |
| 4,506,056 A | 3/1985 | Gaylord |
| 4,540,753 A | 9/1985 | Cozewith et al. |
| 4,585,824 A | 4/1986 | Uchida et al. |
| 4,605,700 A | 8/1986 | Le-Khac |
| 4,683,275 A | 7/1987 | Kato et al. |
| 4,728,463 A | 3/1988 | Sutker et al. |
| 4,732,928 A | 3/1988 | Mizushiro et al. |
| 4,735,992 A | 4/1988 | Nogues |
| 4,771,097 A | 9/1988 | Sackmann et al. |
| 4,772,657 A | 9/1988 | Akiyama et al. |
| 4,889,896 A | 12/1989 | Canova et al. |
| 4,893,055 A | 1/1990 | Fuzzi et al. |
| 4,912,144 A | 3/1990 | McCready |
| 4,921,910 A | 5/1990 | Lunt et al. |
| 4,931,502 A | 6/1990 | McCready |
| 4,996,262 A | 2/1991 | Pyke et al. |
| 5,008,324 A | 4/1991 | Killgoar, Jr. et al. |
| 5,034,449 A | 7/1991 | Mallikarjun |
| 5,037,924 A | 8/1991 | Tazi et al. |
| 5,082,913 A | 1/1992 | Tazi et al. |
| 5,122,161 A | 6/1992 | Benfaremo et al. |
| 5,126,403 A | 6/1992 | Graiver et al. |
| 5,156,920 A | 10/1992 | Aycock et al. |
| 5,202,384 A | 4/1993 | Pyke et al. |
| 5,212,227 A | 5/1993 | Sakazume et al. |
| 5,219,628 A | 6/1993 | Hathaway et al. |
| 5,225,498 A | 7/1993 | Sorathia et al. |
| 5,244,971 A | 9/1993 | Jean-Marc |
| 5,300,569 A | 4/1994 | Drake et al. |

(List continued on next page.)

FOREIGN PATENT DOCUMENTS

| | | |
|---|---|---|
| AU | B-47913/85 | 4/1986 |
| CA | 702610 | 1/1965 |
| DE | 3430802 A1 | 3/1986 |
| DE | 42 25 875 A1 | 2/1994 |
| DE | 42 39437 A1 | 5/1994 |
| DE | 42 41 538 A1 | 6/1994 |
| EP | 0 177 401 A1 | 4/1986 |

(List continued on next page.)

OTHER PUBLICATIONS

L.E. Colleman, Jr., J.F. Bork, and H. Donn, Jr., J. Org. Chem., 24, 185 (1959) Reaction of Primary Alphatle Amines with Maleic Anhydride.

A. Matsumoto, Y. Oki, and T. Otsu, Polymer J., 23(3), 201 (1991). Sythesis, Thermal Properties and Gas permeability of Poly(N–n–alkylmalemide)s.

L. Haeussler, U. Wienhold, V. Albrecht, and S. Zschoche, Thermochim. Acta, 277, 14(1996). Simultaneous TA and MS analysis of Alternating Styrene–Maleic Anhydride and Styrene–Malemide Copolymers.

(List continued on next page.)

*Primary Examiner*—Tae H. Yoon
(74) *Attorney, Agent, or Firm*—David G. Burleson; Scott A. McCollister

(57) ABSTRACT

A polymeric gel composition comprising a polymer including an anhydride unit and an alkenyl unit, a crosslinking agent, a maleated polyalkylene, an extender, and an organic fatty acid is provided. The polymeric gel composition has superior high-temperature stability, mechanical strength, and moldability.

31 Claims, No Drawings

U.S. PATENT DOCUMENTS

| | | |
|---|---|---|
| 5,318,854 A | 6/1994 | Hamersma et al. |
| 5,356,953 A | 10/1994 | Harada et al. |
| 5,373,048 A | 12/1994 | Witzeman et al. |
| 5,414,044 A | 5/1995 | Moriya et al. |
| 5,432,662 A | 7/1995 | Kato et al. |
| 5,472,741 A | 12/1995 | Sackmann et al. |
| 5,489,657 A | 2/1996 | Sue et al. |
| 5,494,964 A | 2/1996 | Meichsner et al. |
| 5,494,981 A | 2/1996 | Gorodisher et al. |
| 5,532,317 A | 7/1996 | Shinmura et al. |
| 5,536,774 A | 7/1996 | Segatta |
| 5,548,031 A | 8/1996 | Doi |
| 5,585,434 A | 12/1996 | DeNicola, Jr. et al. |
| 5,585,436 A | 12/1996 | Niessner et al. |
| 5,602,200 A | 2/1997 | Wissmann |
| 5,618,881 A | 4/1997 | Hojabr |
| 5,634,122 A | 5/1997 | Loucks et al. |
| 5,637,410 A | 6/1997 | Bonner et al. |
| 5,651,927 A | 7/1997 | Auda et al. |
| 5,652,307 A | 7/1997 | Niessner et al. |
| 5,654,364 A | 8/1997 | Bates et al. |
| 5,655,820 A | 8/1997 | Kervagoret |
| 5,658,985 A | 8/1997 | Eichenauer et al. |
| 5,665,820 A | 9/1997 | Liestner et al. |
| 5,670,006 A | 9/1997 | Wilfong et al. |
| 5,684,122 A | 11/1997 | Inoue et al. |
| 5,691,411 A | 11/1997 | Khouri et al. |
| 5,710,228 A | 1/1998 | Krause et al. |
| 5,776,234 A | 7/1998 | Schilling |
| 5,783,630 A | 7/1998 | Evans et al. |
| 5,798,413 A | 8/1998 | Spelthann et al. |
| 5,798,414 A | 8/1998 | Mishima et al. |
| 5,821,032 A | 10/1998 | DoMinh |
| 5,869,695 A | 2/1999 | Ulmer et al. |
| 5,883,188 A | 3/1999 | Hwang et al. |
| 5,905,116 A | 5/1999 | Wang et al. |
| 5,912,296 A | 6/1999 | Wang et al. |
| 5,965,666 A | 10/1999 | Koo et al. |

FOREIGN PATENT DOCUMENTS

| | | |
|---|---|---|
| EP | 0322 905 A2 | 7/1989 |
| EP | 0 408 470 A1 | 1/1991 |
| EP | 0 440 922 A1 | 8/1991 |
| EP | 0 536 753 A1 | 4/1993 |
| EP | 0 728 767 A1 | 8/1996 |
| GB | 922151 | 3/1963 |
| JP | 6-248017 | 9/1954 |
| JP | 60-243102 | 12/1985 |
| JP | 6-56921 | 3/1994 |
| JP | 8-255901 | 10/1996 |
| WO | WO 96/23007 | 8/1996 |
| WO | WO 97/00898 | 1/1997 |

OTHER PUBLICATIONS

W. Kim and K. Seo, Macromol. Rapid Commun., 17, 835(1996). Synthesis and Photocrosslinking of Maleimide –Type Polymers.

W. Lee, and G. Hwong, J. Appl. Polym. Sci., 59, 599 (1996). Polysulfobetaines and Corresponding Cationic Polymers. IV. Synthesis and Aqueous Solution Properties of Cationic Poly (MIQSDMAPM).

I. Vermeesch, and G. Groeninckx, J. Appl. Polym. Sci., 53, 1365(1994). Chemical Modification of Poly(styrene–co –maleic anhydride) with Primary N–Alkylamines by Reactive Extrusion.

SOFT POLYMER GEL

FIELD OF THE INVENTION

The present invention relates to a high damping polymer gel composition with superior high-temperature stability, mechanical strength and moldability. The inventive composition is particularly useful as a molding material for various products.

BACKGROUND OF THE INVENTION

The polymerization of isobutylene and maleic anhydride is known, as is the polymerization of styrene and maleic anhydride, and the polymerization of methyl vinyl ether and maleic anhydride. These polymerization techniques are carried out by free radical initiation. Further, imidization between a maleic anhydride and a primary amine group is a commonly known chemical reaction.

It has long been recognized that two or more polymers may be blended together to form a wide variety of random or structured morphologies to obtain products that potentially offer desirable combinations of characteristics. However, it maybe difficult or even impossible in practice to achieve many potential combinations through simple blending because of some inherent and fundamental problem. Frequently, the two polymers are thermodynamically immiscible, which precludes generating a truly homogeneous product. While it is sometimes desirable to have a two-phase structure, the situation at the interface between these two phases very often leads to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

SUMMARY OF THE INVENTION

The present invention is a polymeric gel composition comprising a polymer including an anhydride unit and an alkenyl unit; a crosslinking agent; a maleated polyalkylene; an extender; and an organic fatty acid.

According to one embodiment of this invention, a grafted "centipede" polymer of a maleated polyalkylene and a poly(alkenyl-co-maleimide) that is useful in producing high damping, soft materials with high service temperatures is provided. The centipede polymer can be formed by reacting polymeric constituents with a grafting agent, followed by mixture with an organic fatty acid.

It is an advantage of the invention to a produce centipede polymer composition that exhibits improved properties such as tensile strength, maximum elongation, tear strength, damping properties, high temperature compression set, and the like, with emphasis on the high temperature compression set. More particularly, the present inventive grafted poly(alkenyl-co-maleimide) copolymers combine with organic fatty acids to improve the tensile strength, tear strength, damping properties, and high-temperature compression set of the centipede polymer.

DETAILED DESCRIPTION OF THE INVENTION

The polymer gel composition of the present invention contains: 0.5–200 parts by weight of a poly(alkenyl-co-maleimide) having at least one maleated polyalkylene segment grafted thereto through at least one functional linkage formed by a cross-linking reaction with a grafting agent; and greater than 0 to about 100 parts by weight of an organic fatty acid.

The poly(alkenyl-co-maleimide) is a "centipede" polymer formed by imidizing a poly(alkenyl-co-maleic anhydride) with a primary amine. The "centipede" polymer has a high molecular weight spine connected with many relatively short side chains formed from the addition of the primary amines. The length of the main chain usually equals or is longer than the entanglement length, which is herein defined theoretically as an order of magnitude of 100 repeating units, while the length of the side chains is much smaller than the entanglement length.

The preferred alkenyl benzene contributed monomer units of the poly(alkenyl benzene-co-maleimide) "centipede" are any one or combination of styrene, α-methylstyrene, 1-vinylnapthalene, 2-vinyl-napthalene, 1-α-methylvinylnaphthalene, 2-α-methylvinylnaphthalene, as well as alkyl, cycloalkyl, aryl, alkaryl, and aralkyl derivatives thereof, in which the total number of carbon atoms in the combined hydrocarbon is generally not greater than 12, as well as any di- or tri-vinyl aromatic hydrocarbons. The preferred vinyl aromatic hydrocarbons are either styrene or a-methylstyrene. The terms "alkenyl benzene" and "vinyl aromatic" are understood to be interchangeable as used herein.

The preferred $R_1R_2$ethylene contributed monomer units of the poly($R_1R_2$ethylene-co-maleimide) "centipede" are any alkene such as ethylene, propylene, butylene, isobutylene, pentene, hexene, heptene, etc., as well as any di- or tri-alkene, with preference given to isobutylene.

The preferred alkyl vinyl ether contributed monomer units of the poly(alkyl vinyl ether-co-maleimide) "centipede" are any one or combination of methyl vinyl ether, ethyl vinyl ether, propyl vinyl ether, butyl vinyl ether, and any other alkyl vinyl ether wherein the number of carbons in the alkyl substituent is between 1 and 12. The preferred alkyl vinyl ether is methyl vinyl ether.

The poly(alkenyl-co-maleimide) described herein are subsequently graft-reacted through a difunctional linking or grafting agent to a maleated polyalkene to yield a maleated polymer having at least one polyalkylene segment grafted thereto through the at least one functional linkage thus formed. The alkylene moiety of the polyalkene may be, for example, ethylene, propylene, and mixtures of both. The preferred polyalkene is polypropylene.

The maleated polypropylene may be any of the conventionally known polypropylene compounds that are subsequently maleated by methods known in the art. The polypropylene grafted segment or segments have molecular weights $M_w$ of about 10,000 up to about 10,000,000, or higher, preferably about 20,000 to about 300,000.

The crystallinity, or tacticity, of the polypropylene may vary from being substantially amorphous to being completely crystalline, that is from about 10–100% crystallinity. Most typically, because of the extensive commercial use of isotactic polypropylene, the grafted polypropylene will be substantially crystalline, e.g., greater than about 90%. The polypropylene may be substantially free of ethylene. However, under certain circumstances small amounts of ethylene, on the order of less than about 10% by weight, may be incorporated. Furthermore, in certain instances the polypropylene contains small amounts of ethylene in copolymers known as "reactor copolymers". Thus, it is within the scope of the invention that the grafted polypropylenes contain minor amounts of ethylene, both as part of the ethylene-propylene segments and as polyethylene segments.

The maleated polypropylene of this invention contains from about 0.01 wt. % incorporated maleic anhydride, based upon the weight of the maleated polypropylene, up to about 5 wt. %. Preferably, the maleic anhydride content will be from about 0.01 to about 2 wt. %, most preferably about 0.03 to about 0.2 wt. %. As will be apparent, unreacted polypropylene will also be present in the reaction mix as will minor amounts of reaction by-products, such as decomposed free-radical initiator compounds and low molecular weight free-radical products. These by-products are substantially removed, by methods known in the art, e.g. sparging with nitrogen or washing with water. Maleic anhydride may not be left in substantial amounts in the polymer without detrimental effects on the subsequent reaction of the poly(alkenyl-co-maleimide) with the maleated polypropylene.

The poly(alkenyl-co-maleimide) of the instant invention is formed by reacting a poly(alkenyl-co-maleic anhydride) in the presence of a mono-primary amine at a temperature from about 100° C. to about 300° C. and at a pressure from about slightly above vacuum to about 20 atmospheres, under substantially dry conditions. The reactants are preferably dry mixed in the absence of solvents in a suitable mixing apparatus such as a Brabender mixer. It is preferable to purge the mixer with nitrogen prior to the charging of the reactants. The primary amine may be added in a singular charge or in sequential partial charges into the reactor containing a charge of poly(alkenyl-co-maleic anhydride). Preferably the primary amine is charged in ratio between 0.8 to 1.0 moles of amine per monomer contributed units of maleic anhydride in the poly(alkenyl-co-maleic anhydride).

Suitable primary amines include but are not limited to: alkyl amines; alkyl benzyl amines; alkyl phenyl amines; alkoxybenzyl amines; allyl aminobenzoates; alkoxy aniline; and other linear primary amines containing from 1 to 50 carbon atoms, preferably 6 to 30 carbon atoms in the alkyl and alkoxy substituents in these primary amines. It is understood that the alkyl and alkoxy substituents on the above discussed primary amines can be linear or branched, preferably linear, and saturated or unsaturated, preferably saturated. Exemplary, but not exclusive of such amines are hexylamine, octylamine, dodecylamine, and the like.

The poly(alkenyl-co-maleimide), prior to grafting with maleated polypropylene, preferably has a molecular weight range between about 10,000 and 500,000, and even more typically between about 150,000 and 450,000, where the molecular weight is weight-average (Mw).

The centipede polymer of the present invention may be prepared by any means well known in the art for combining such ingredients, such as blending, milling, or internal batch mixing. A rapid and convenient method of preparation comprises heating a mixture of the components to a temperature of about 50–290° C.

The centipede polymers of this invention are preferably manufactured by mixing and dynamically heat-treating the components described above, namely, by melt-mixing. As for the mixing equipment, any conventional, generally known equipment such as an open-type mixing roll, closed-type Banbury mixer, closed-type Brabender mixer, extruding machine, kneader, continuous mixer, etc., is acceptable. The closed-type Brabender mixer is preferable, and mixing in an inactive gas environment, such as nitrogen or argon, is also preferable.

Grafting of maleated polyalkylene and poly(alkenyl-co-maleimeide) is performed by addition of a grafting agent containing two or more reactive functional groups. Acceptable functional groups include primary amine, secondary amine, carboxyl, formyl, hydroxyl, vinyl, etc. The preferred grafting agent is an organic diamine, which is added to a blend of maleated polyalkylene and poly(alkenyl-co-maleimeide) to partially cross-link the polyalkylene to the poly(alkenyl-co-maleimeide) through the maleate functional groups.

Suitable organic diamines or diamine mixtures containing two aliphatically or cycloaliphatically bound primary amino groups are used as grafting agents for the process according to the present invention. Such diamines include, for example, aliphatic or cycloaliphatic diamines corresponding to the following formula $R_1(NH_2)_2$ wherein $R_1$ represents an aliphatic hydrocarbon group having from 2 to 20 carbon atoms, a cycloaliphatic hydrocarbon group having from 4 to 20 carbon atoms, or an aromatic hydrocarbon group having from 6 to 20 carbon atoms or an N-heterocyclic ring having from 4 to 20 carbon atoms, e.g., ethylenediamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexyl amine; 3-aminomethyl-3,5,5-trimethyl-cyclohexylamine; 1,2-bis-(amino-methyl)-cyclobutane; 1,2-diamino-3,6-dimethylbenzene; 1,2- and 1,4-diaminocyclohexane; 1,2-, 1,4-, 1,5-, and 1,8-diaminodecalin; 1-methyl-4-aminoisopropyl-cyclo-hexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diaminodicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline; 3,3'-dimeth-oxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$–$C_6$-dianiline; 4,4'-methylene-dianiline; aniline-formaldehyde resin; trimethylene glycol di-p-aminobenzoate; bis-(2-aminoethyl)-amine, bis-(3-aminopropyl-amine, bis-(4-aminobutyl)-amine; bis-(6-aminohexyl)-amine, and isomeric mixtures of dipropylene triamine and dibutylene triamine. Mixtures of these diamines may also be used.

Other suitable polyamines for use as grafting agents in the process according to the present invention include bis-(aminoalkyl)-amines, preferably those having a total of from 4 to 12 carbon atoms, such as bis-(2-aminoethyl)amine, bis-(3-aminopropyl)amine, bis-(4-aminobutyl)amine, and bis-(6-aminohexyl)amine, and isomeric mixtures of dipropylene triamine and dibutylene triamine. Hexamethyl diamine, tetramethylene diamine, and especially 1,12-diaminododecane are preferably used.

The centipede polymers of the present invention have an extender added to the polymer during final processing. Suitable extenders include extender oils and low molecular weight compounds or components, such as the extenders including: naphthenic, aromatic, paraffinic, pthalic, and silicone oils. A preferred extender for the present invention is a pthalic oil. The preferred pthalic oil is di(tridecyl)phthalate from the C. P. Hall Company. This oil is added in the final stages of the preparation of the centipede polymer. The final centipede polymer can contain between 25 and 40% oil and is a thermoreversible elastomer.

After the centipede polymer is formed, a fatty acid is added. The fatty acid chosen for the present invention can be saturated, such as: butyric acid, caproic acid, caprylic acid, capric acid, lauric acid, myristic acid, palmitic acid, or stearic acid; or unsaturated, such as palmitoleic acid, oleic acid, linoleic acid, or linolenic acid. The preferred acids are saturated.

The fatty acids used may also be monofunctional or difunctional. Suitable monofunctional acids include butyric acid, caproic acid, caprylic acid, capric acid, lauric acid, myristic acid, palmitic acid, stearic acid, palmitoleic acid, oleic acid, linoleic acid, linolenic acid, or mixtures thereof Suitable difunctional acids include sabaric acid, hexadecanedioc acid, dodecanedioc acid, 5-(octadecyloxy) isophthalic acid, and any other difunctional organic acids with up to 50 carbons.

Polyacids are also acceptable for use in the present invention. The preferred polyacids have a weight average molecular weight between about 500 to about 500,000. Suitable polyacids include poly(ethylene-co-acrylic acid), poly(propylene-co-acrylic acid), poly(acrylic acid), and other polyacids containing acrylic acid, acrylonitrile, and acrylamide monomer units, and mixtures thereof Generally, these polyacids may have an acrylic acid weight percent between about 0.2% to about 100%.

In general, the preferred organic fatty acids in the present invention are both mono and di functional, also preferred are low $M_w$ polyacids. The preferred acrylic acid content of the polyacids is less than about 25%.

Generally, about 5 to 65 parts by weight of organic fatty acid can be mixed with about 35 to 100 parts by weight of centipede polymer. The resulting gel has a high temperature compression set at 100° C. of less than about 40%, and at 130° of less than about 50%. The Shore A hardness for the centipede polymer mixed with fatty acid is between about 10 and 55, and the tan δ at temperatures greater than 20° C. is greater than about 0.25.

In summary, the molded polymers produced from the blend of the present centipede polymer and fatty acid retain elastomeric characterstics and are useful in high damping applications.

It is frequently desirable to include other additives well known in the rubber art to the compositions of the present application. Stabilizers, antioxidants, conventional fillers, reinforcing agents, reinforcing resins, pigments, fragrances, and the like are examples of some such additives. Specific examples of useful antioxidants and stabilizers include 2-(2'-hydroxy-5'-methylphenyl)benzotriazole, nickel di-butyl-di-thiocarbamate, zinc di-butyl-di-thiocarbamate, tris (nonylphenyl)phosphite, 2,6-di-t-butyl-4-methylphenol, and the like. Exemplary conventional fillers and pigments include silica, carbon black, titanium dioxide, iron oxide, and the like. These compounding ingredients are incorporated in suitable amounts depending upon the contemplated use of the product, preferably in the range of 1–350 parts of additives or compounding ingredients per 100 parts of the polymer composition.

A reinforcement may be defined as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion, and processability. Examples of other elastomers and resins include adhesive-like products including Reostomer (produced by Riken-Vinyl, Inc.), hydrogenated polystyrene-(medium or high 3,4) polyisoprene-polystyrene block compolymers such as Hybler (produced by Kurare, Inc.), polynorbornenes such as Norsorex (produced by Nippon Zeon, Inc.), and the like. In this case the foregoing materials are equally applicable to the instant centipede polymer compositions.

Damping is the absorption of mechanical energy by a material in contact with the source of that energy. It is desirable to damp or mitigate the transmission of mechanical energy from, for example, a motor, engine, or power source to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

The compositions of the present invention are favorably used in the manufacturing of any product in which some of the following properties are advantageous: a degree of softness, heat resistance, decent mechanical properties, elasticity and/or high damping. The compositions of the present invention can be used in all industry fields, in particular, in the fabrication of automotive parts, tire tread rubbers, household electrical appliances, industrial machinery, precision instruments, transport machinery, constructions, engineering, medical instruments, and tire rubber formulations.

Representative examples of the composition of the present invention are in the fabrication of damping materials and vibration restraining materials. These uses involve connecting materials such as sealing materials, packing, gaskets, and grommets, supporting materials, such as mounts, holders, and insulators, and cushion materials such as stoppers, cushions, and bumpers. These materials are also used in equipment producing vibration or noise and household electrical appliances, such as in air-conditioners, laundry machines, refrigerators, electric fans, vacuums, dryers, printers, and ventilator fans. These materials are also suitable for impact absorbing materials in audio equipment and electronic or electrical equipment, sporting goods, and shoes.

The present invention will also be useful in any application where a superior high temperature compression set is desirable. With a compression set of less than 50% at 130° C., this composition can be used in a variety of high temperature applications. One example of this would be as coatings, especially for windows and car windshields which retain heat and cause polymers with lower service temperatures to melt.

In the following, the present invention will be described in more detail with reference to non-limitative examples. The following examples and tables are presented for purposes of illustration only and are not to be construed in a limiting sense.

EXAMPLE 1

To a 6 L kneader-extruder (MXE-6, Jaygo, Inc.) equipped with sigma blades was added 2.76 lb. of a poly(maleicanhydride-alt-isobutylene) (Isoban-10, from Kurary Co., LTD) and 2.18 lb. of octylamine (from BASF, 99% purity) at 54° C. The mixing was started with the blade speed of 25 rpm and the screw speed of 40 rpm for 5 minutes, and then the temperature of the mixer was adjusted to rise to 190° C. at a rate of about 3° C. per minute. The mixing was further continued for 2 more hours isothermally at 190° C. Then, 1.24 lb. of maleated polypropylene (PO1015, from Exxon) was added to the mixer. Mixing was continued for another 30 minutes. Then, 23 g of dedecane diamine (from Aldrich, 98% purity) were added to the mixer. After an additional 15 minutes, a total 3.08 lb. of DTDP oil [di(tridecylphthalte), from the C. P. Hall Company] was added to the mixer and the temperature of the mixer was adjusted to 160° C. After another 2 hours, the final product was then extruded through a ¼ inch die. The final product contained 33% DTDP oil and was a thermoreversible elastomer.

EXAMPLE 2

A charge of 25 g of the product from the experiment of Example 1 was added to a Brabender mixer (~55g capacity) equipped with a roller blade and nitrogen purging. The mixer was initially set to 160° C. and 60 rpm. After 3 minutes, a charge of 10 g of stearic acid was added to the mixer. The material was further mixed at those conditions for 17 minutes. Then, the agitation was turned off and the mixture was removed from the mixer.

EXAMPLE 3

To a Brabender mixer (~55 g capacity) equipped with a roller blade and nitrogen purging, a charge of 45 g of the product from the experiment of Example I was added. The mixer was initially set to 160° C. and 60 rpm. After 3 minutes, a charge of 5 g of stearic acid was added to the mixer. The material was further mixed at those conditions for 17 minutes. Then, the agitation was turned off and the mixture was removed from the mixer.

EXAMPLE 4

The experiment and the procedure of example 3 were repeated, except for a minor change in the charges of the materials. In this sample, to the mixer was charged 40 g of example 1 and 10 g of stearic acid. The total mixing time was 20 minutes.

EXAMPLE 5

The experiment and the procedure of example 3 were repeated, except for a minor change in the charges of the materials. In this sample, to the mixer was charged 35 g of example 1 and 15 g of stearic acid.

EXAMPLE 6

The experiment and the procedure of example 3 were repeated, except for a minor change in the charges of the materials. In this sample, to the mixer was charged 30 g of example 1 and 20 g of stearic acid.

EXAMPLE 7

To the same Brabender mixer used in example 1, a charge of 36 g of the product from the experiment of example 1 was added. The mixer was initially set to 160° C. and 60 rpm. After 3 minutes, a charge of 4g of stearic acid was added to the mixer. After an additional 7 minutes, a total 10 g of DTDP oil was added slowly (~2 g per minute) to the mixer. Then, the material was further mixed at those conditions for 5 minutes. Finally, the agitation was turned off and the mixture was removed from the mixer.

EXAMPLE 8

The experiment and the procedure of example 7 were repeated, except for a change in the charges of the materials. In this sample, to the mixer was charged 21 g of example 1 and 9 g of stearic acid and 20 g of DTDP oil.

These products were molded into sheets and cylinder buttons at ~160° C. Ring samples were cut from these sheets for tensile measurements. The details of the physical properties are shown in Table 1. As can be seen, the products were soft and thermoreversible gels. Those materials (examples 2 through 8) with fatty acids in their compositions exhibited better thermostabilities. Moreover, examples 2 to 8 may have a service temperature up to 130° C. Finally, all materials shown in the table are thermally recyclable at 160° C.

TABLE 1

| Samples | C.S. 100° C. | C.S. 130° C. | Tb/Eb psi/% | Shore A | tan δ 20° C. | tan δ 30° C. | tan δ 40° C. |
|---|---|---|---|---|---|---|---|
| 1(comp) | 49.0% | 82.1% | 268/217 | 30 | 0.60 | 0.58 | 0.42 |
| 2 | 36.8% | 46.5% | 177/142 | 33 | 0.61 | 0.57 | 0.41 |
| 3 | 35.0% | 41.9% | 203/226 | 34 | 0.61 | 0.51 | 0.37 |
| 4 | 23.4% | 38.2% | 181/162 | 38 | 0.53 | 0.48 | 0.36 |
| 5 | 33.3% | 41.5% | 143/88 | 48 | 0.50 | 0.47 | 0.38 |
| 6 | 10.8% | 18.3% | 115/46 | 49 | 0.47 | 0.46 | 0.38 |
| 7 | 33.7% | 37.9% | 83/196 | 24 | 0.49 | 0.42 | 0.32 |
| 8 | 12.4% | 31.4% | 33/118 | 13 | 0.42 | 0.40 | 0.33 |

What we claim is:

1. A polymeric gel composition comprising:
   a. a polymer including a maleimide unit and an alkenyl unit,
   b. a crosslinking agent,
   c. a maleated polyalkylene,
   d. an extender, and
   e. an organic fatty acid.

2. The composition of claim 1 wherein said maleimide unit is formed by reacting an anhydride unit with a primary amine.

3. The composition of claim 1 wherein said alkenyl unit is chosen from the group consisting of vinyl aromatic hydrocarbon, $R_1R_2$ ethylene, or alkyl vinyl ether.

4. The composition of claim 3 wherein said vinyl aromatic hydrocarbon is chosen from the group consisting of any one or combination of styrene, α-methylstyrene, 1-vinylnaphthalene, 2-vinylnaphthalene, 1-α-methylvinylnaphthalene, 2-α-methylvinylnaphthalene, and alkyl, cycloalkyl, aryl, alkaryl, and aralkyl derivatives thereof, in which the total number of carbon atoms in the combined hydrocarbon is not greater than about 12, and any di-or tri-vinyl aromatic hydrocarbons.

5. The composition of claim 4 wherein said vinyl aromatic hydrocarbon is either styrene or α-methylstyrene.

6. The composition of claim 3 wherein said $R_1R_2$ ethylene-contributed monomer unit is chosen from the group consisting of ethylene, propylene, butylene, isobutylene, pentene, hexene, and heptene.

7. The composition of claim 6 wherein said $R_1R_2$ ethylene unit is isobutylene.

8. The composition of claim 3 wherein said alkyl vinyl ether is chosen from the group consisting of methyl vinyl ether, ethyl vinyl ether, propyl vinyl ether, butyl vinyl ether, other alkyl vinyl ethers wherein the number of carbons in the alkyl substituent is generally not greater than 12, and mixtures thereof.

9. The composition of claim 8 wherein said alkyl vinyl ether is methyl vinyl ether.

10. The composition of claim 1 wherein said crosslinking agent is comprised of a low molecular weight organic compound having 1 or more functional groups.

11. The composition of claim 10 wherein said functional groups are primary amine, secondary amine, carboxyl, formyl, or hydroxyl.

12. The composition of claim 11 wherein said crosslinking agent is an amine chosen from the group consisting of ethylenediamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethylcyclohexylamine; 1,2-bis-(amino-methyl)-cyclobutane; 1,2-diamino-3,6-dimethylbenzene; 1,2- and 1,4-diaminocyclo-hexane; 1,2-, 1,4-, 1,5-, and 1,8-diaminodecalin; 1-methyl-4-aminoisopropyl-cyclohexylamine; 4,4'-diaminodicyclohexyl; 4,4'-diamino-dicyclohexyl methane; 2,2'-(bis-4-amino-cyclohexyl)-propane, 3,3'-dimethyl-4,4'-diaminodicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline; 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; methylenebis(o-chloroaniline); bis(3,4-diaminophenyl)sulfone; diaminodiphenylsulfone; 4-chloro-o-phenylenediamine; m-aminobenzylamine; m-phenylenediamine; 4,4'-$C_1$–$C_6$-dianiline; 4,4'-methylenedianiline; aniline-formaldehyde resin; trimethylene glycol di-p-aminobenzoate; bis-(2-aminoethyl)-amine, bis-(3-aminopropyl)-amine, bis-(4-aminobutyl)-amine; bis-(6-aminohexyl)-amine, and isomeric mixtures of dipropylene triamine, dibutylene triamine, and mixtures thereof.

13. The composition of claim 1 wherein said crosslinking agent is dodecane diamine.

14. The composition of claim 1 wherein said polyalkylene is grafted to said polymer.

15. The composition of claim 1 wherein the monomer from which the alkylene moiety of said maleated polyalkylene is formed is selected from ethylene, propylene, and mixtures of both.

16. The composition of claim 1 wherein said extender is an oil.

17. The composition of claim 16 wherein said oil is a phthalic acid oil.

18. The composition of claim 1 wherein said organic fatty acid is either saturated or unsaturated.

19. The composition of claim 1 wherein said organic fatty acid is mono- or di-functional.

20. The composition of claim 1 wherein said organic fatty acid is a polyacid.

21. The composition of claim 20 wherein said polyacid is chosen from the group consisting of poly(ethylene-co-acrylic acid), poly(propylene-co-acrylic acid), poly(acrylic acid), polyacids containing acrylic acid, acrylonitrile, or acrylamide monomer units, and mixtures thereof.

22. The composition of claim 20 wherein the acrylic weight percent of said polyacid is between about 0.2% and about 25%, and the $M_w$ of said polyacid is between about 500 and 500,000.

23. The composition of claim 1 wherein said organic fatty acid is chosen from the group consisting of butyric acid, caproic acid, caprylic acid, capric acid, lauric acid, myristic acid, palmitic acid, stearic acid, palmitoleic acid, oleic acid, linoleic acid, linolenic acid, savaric acid, hexadecanedioic acid, dodecanedioic acid, 5-(octadecyloxy)isophthalic acid, other organic acids with up to 50 carbon atoms, poly(ethylene-co-acrylic acid), poly(propylene-co-acrylic acid), poly(acrylic acid), and polyacids containing acrylic acid, acrylonitrile, or acrylamide monomer units, and mixtures thereof.

24. The composition of claim 1 wherein said organic fatty acid is stearic acid.

25. The composition of claim 1 having compression set values at 100° C. of less than about 40% and at 130° C. of less than about 50%.

26. The composition of claim 1 having hysteresis values at greater than 20° C. of tan δ greater than about 0.300.

27. The composition of claim 1 wherein said gels are thermally recyclable up to ~160° C.

28. polymer gel composition comprising:
a. a polymer including a maleimide unit and a vinyl aromatic hydrocarbon unit,
b. a crosslinking agent,
c. a maleated polyalkylene,
d. an extender, and
e. an organic fatty acid.

29. A polymer gel composition comprising:
a. a polymer including a maleimide unit and a $R_1R_2$ethylene unit, and mixtures thereof,
b. a crosslinking agent,
c. a maleated polyalkylene,
d. an extender, and
e. an organic fatty acid.

30. A polymer gel composition comprising:
a. a polymer including a maleimide unit and an alkyl vinyl ether unit,
b. a crosslinking agent,
c. a maleated polyalkylene,
d. an extender, and
e. an organic fatty acid.

31. A method of forming a soft polymer gel compound comprising reacting a poly(alkenyl-co-maleic anhydride) with a primary amine, followed by grafting of a maleated polyalkylene via a di-functional grafting agent, and mixing the product with an organic fatty acid.

* * * * *